W. L. BODMAN.
WHEEL FOR MOTOR AND OTHER VEHICLES.
APPLICATION FILED MAR. 25, 1919.
1,310,732.
Patented July 22, 1919.
2 SHEETS—SHEET 1.
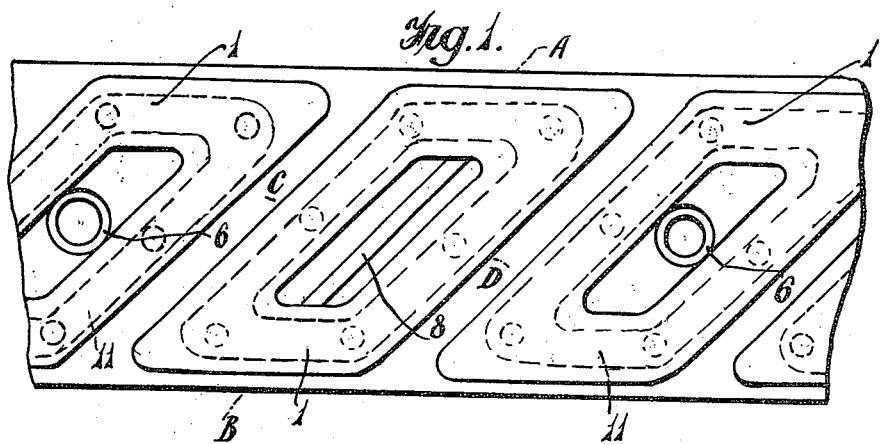
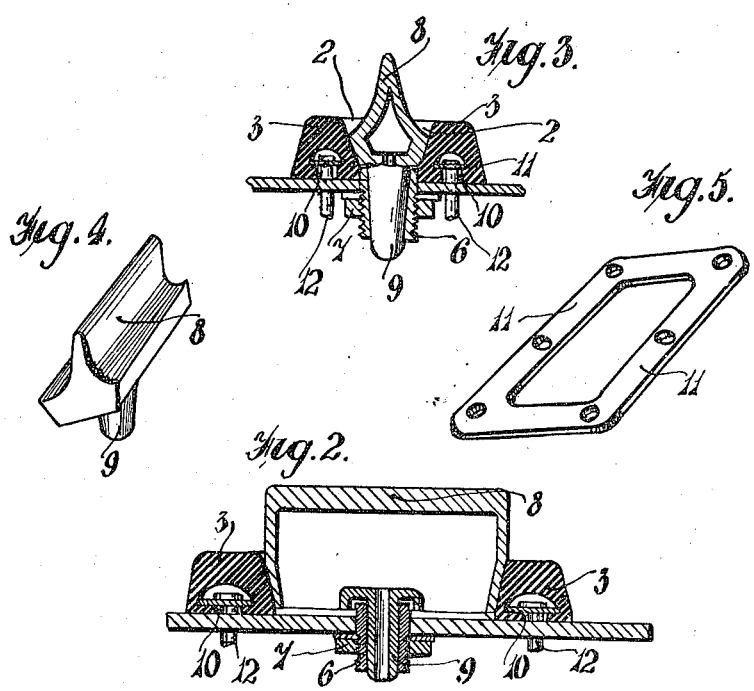

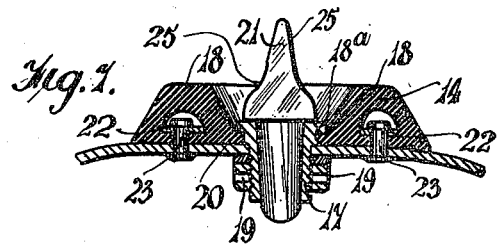
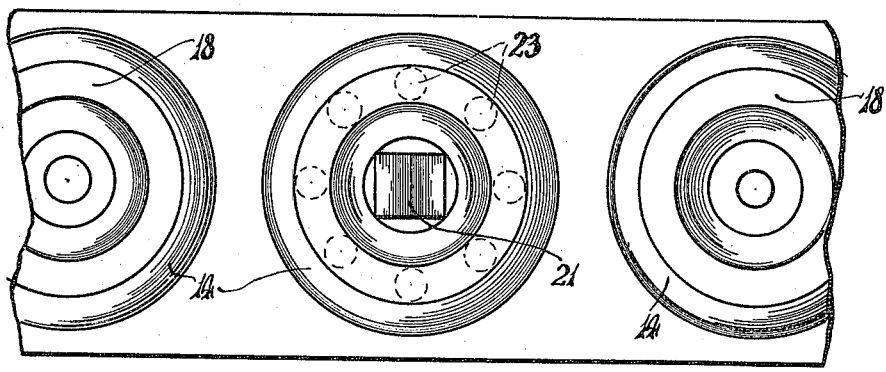
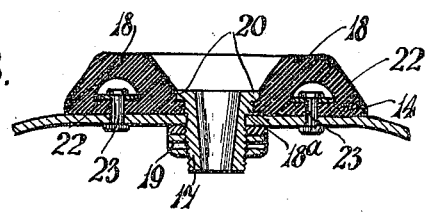
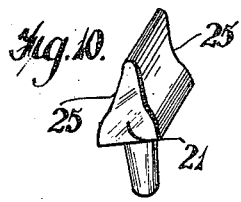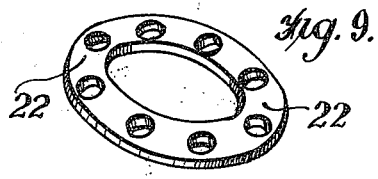

UNITED STATES PATENT OFFICE.

WALTER LIGHT BODMAN, OF BROMSGROVE, ENGLAND.

WHEEL FOR MOTOR AND OTHER VEHICLES.

1,310,732.　　　　　Specification of Letters Patent.　　Patented July 22, 1919.

Application filed March 25, 1919. Serial No. 285,070.

*To all whom it may concern:*

Be it known that I, WALTER LIGHT BODMAN, a subject of the King of Great Britain, residing at Lydiate Ash, Bromsgrove, in the county of Worcester, England, have invented certain new and useful Improvements in Wheels for Motor and other Vehicles; and I do hereby declare the following to be a full, clear, and exact description of the same.

This invention comprises improvements relating to wheels for motor and other vehicles and relates to gripping media for such wheels, more particularly those intended to be used for haulage purposes upon the road or other hard ground or upon soft agricultural land.

It is well-known that gripping media which are suitable for use upon hard roads are generally unsuitable for use upon soft land, while similarly gripping media suitble for use upon soft land are generally unsuitable for use upon the hard road.

This invention is particularly intended for use with agricultural tractors which are used under these two totally different circumstances, namely, on agricultural land and also upon hard roads. The provision of a tractor for these two purposes has hitherto involved alteration in the form of the tire when transferring the tractor from the one purpose to the other, the land tires or land gripping media being unsuitable for use upon the road.

The first object of the present invention is to obviate this defect and to provide an improved form of tire or gripping media which can be used for the dual purposes.

A second object is to arrange the gripping media so that additional media may be readily provided if necessary for use upon very wet or soft land.

A third object is to provide a means of securing the gripping media to the rims of the wheels.

According to this invention the tire or wheel is provided with studs of rubber or other resilient material having a hollow center in which a detachable metal stud or spike is adapted to be placed if such be found necessary when working upon very soft or wet land.

The gripping media are disposed on the rim of the wheel, such gripping media being held in position by plates which are preferably flexible so as to conform to the circumference of the wheel when they are clamped in position.

When a plane surface is attached to a cylinder in a plane which forms an angle more or less acute to the circumferential axis of the cylinder, e. g., a wheel rim, a helix or part of a helix is formed. The attachment of any substances to a rim at such angles when carried out by the use of rigid and similarly disposed plates, necessitates very expensive fitting and it is almost impossible to make the configuration perfect unless the cylinders or rims are carefully machined. In the case of rims for vehicles it is not usual to accurately machine these, so that their surfaces are irregular, often non-circular and of an irregular diameter.

According to this invention the sectional lengths of tire are secured by flexible plates the attachment of which to the rim will automatically adapt them to the required helical form. This plate may be conveniently made of wood, metal, or other flexible material and is securely bolted above a flange or band portion formed on the tire so as to hold the various sectional lengths of the resilient tire to the rigid metal rim.

A wooden plate may be used covered with thin sheet metal for protective and strengthening purposes without impairing the flexibility of the plate.

The plate may be initially pressed or formed approximately to the required shape and the final bending effected *in situ*.

Referring to the drawings:—

Figure 1. illustrates the surface or periphery of a tire fitted with studs according to one form of this invention.

Fig. 2. is a section at A—B in Fig. 1.

Fig. 3. is a section at C—D in Fig. 1.

Fig. 4. illustrates the metal stud removed.

Fig. 5. illustrates one attachment plate removed.

Fig. 6. illustrates a similar view to Fig. 1 showing a modified form of stud.

Fig. 7. is a sectional view of one of the studs *in situ*.

Fig. 8. is a similar view with the metal stud removed.

Fig. 9. illustrates one of the attachment plates in perspective.

Fig. 10. is a similar view of one of the metal studs removed.

In carrying this invention into practice as illustrated upon the accompanying drawings at Figs. 1–5 the rubber stud 1 is of rhomboidal form in plan. The said rubber stud has a hollow center 2 so arranged that the rubber stud will have a suction or vacuum effect when engaging the road so as to obtain a firm grip without destroying the road surface.

A hole is provided in the center of the rubber stud through which a sleeve 6 is passed from the outside, the sleeve also passing through a hole in the rim and being screwed at its end so that it may receive a nut 7 which serves to secure the sleeve in position.

The metal member 8 or stud may be of conical or wedge shape and rhomboidal form in plan, and having its extremity projecting considerably above the top of the rubber member. The metal member also has a shank portion 9 which projects through the sleeve. As shown the sleeve and stem are tapered respectively inside and outside so that the stud will be frictionally held in place.

To secure the rubber member in place, the projecting portion 3 of the rubber stud 1 is preferably molded so as to be of a hollow section, there being a slot or opening 10 between this hollow center and the under surface of the stud. Within this hollow center a resilient rhomboidal frame 11 is inserted having a width greater than that of the slot, this frame being fitted with a number of bolts 12, the shanks of which project below the under surface of the stud. These frames 11 may be conveniently made of multi-ply wood and they are preferably flexible so that they will accommodate themselves to the curvature of the tire when screwed up, but if desired they might be manufactured with the required curvature. The members 12 may be secured by nuts, riveted to the rim, or otherwise secured.

In Fig. 1 one of the metal studs is shown in position while they are removed from the other rubber studs.

As shown in Figs. 6–10 the rubber stud 14 is of circular shape and has an annular projection 18 around the periphery of its outer surface, leaving a hollow center, the sectional form of the annular projection being preferably that of a truncated cone, being so arranged that the rubber stud will have the suction or vacuum effect already referred to.

In this case the outer end of the sleeve 17 has two parts of greater diameter than its main length forming two shoulders, one of which 18ª abuts against the outer surface of the rim and against which it is locked by the nut 19 so that the sleeve is firmly secured in position. The part of greatest diameter forms a flange 20 which fits over the rubber member and serves to hold it in place.

The metal stud 21 is of the same shape as that previously explained but of square form in plan.

The rubber stud 14 is secured in place by an annular flexible ring 22 by means of bolts 23.

As will be seen the sides of the metal studs are concave as at 25, 25 to enable them to enter and leave the ground with a minimum loss of power.

What I claim then is:—

1. In a wheel for motor and other vehicles the combination of a rim; a rubber gripping stud; a flexible securing plate arranged inside said rubber stud and whereby said stud is secured to the rim; and a metal stud detachably mounted in the middle of the rubber stud, for the purpose specified.

2. In a wheel for motor and other vehicles the combination of a rim; a rubber gripping stud of rhomboidal shape; a securing plate also of rhomboidal shape arranged inside said rubber stud and whereby said stud is secured to the rim; and a metal stud detachably mounted in the middle of the rubber stud, for the purpose specified.

3. In a wheel for motor and other vehicles the combination of a rim; a tapered socket radially disposed in said rim; a rubber gripping stud; a flexible securing plate arranged inside said rubber stud and whereby said stud is secured to the rim; and a metal stud detachably mounted in the middle of the rubber stud and having a tapered shank which fits into said tapered socket, for the purpose specified.

4. In a wheel for motor and other vehicles the combination of a rim; a tapered socket radially disposed in said rim; a rubber gripping stud of rhomboidal shape; a securing plate also of rhomboidal shape arranged inside said rubber stud and whereby said stud is secured to the rim; and a metal stud detachably mounted in the middle of the rubber stud and having a tapered shank which fits into said tapered socket, for the purpose specified.

In witness whereof I affix my signature.

WALTER LIGHT BODMAN.